(12) United States Patent
Boehnlein et al.

(10) Patent No.: US 6,786,040 B2
(45) Date of Patent: Sep. 7, 2004

(54) EJECTOR BASED ENGINES

(75) Inventors: John Boehnlein, Tahoe City, CA (US);
Joseph Bendot, Camarillo, CA (US);
Francis Schoelen, Post Falls, ID (US)

(73) Assignee: Space Access, LLC, Huntertown, IN (US)

(*) Notice: Subject to any disclaimer, the term of this patent is extended or adjusted under 35 U.S.C. 154(b) by 99 days.

(21) Appl. No.: 10/081,343

(22) Filed: Feb. 20, 2002

(65) Prior Publication Data

US 2003/0154720 A1 Aug. 21, 2003

(51) Int. Cl.[7] .................................................. F02K 7/08
(52) U.S. Cl. ........................... 60/269; 60/767; 244/53 B
(58) Field of Search ....................... 60/269, 266, 200.1, 60/267, 767, 771, 800; 244/53 B; 239/265.19, 265.23

(56) References Cited

U.S. PATENT DOCUMENTS

| | | | | |
|---|---|---|---|---|
| 2,690,648 A | * | 10/1954 | Pearce et al. | 60/739 |
| 2,995,893 A | * | 8/1961 | Morris et al. | 60/246 |
| 3,143,856 A | * | 8/1964 | Hausmann | 239/265.17 |
| 3,812,672 A | * | 5/1974 | Escher | 60/244 |
| 4,499,735 A | * | 2/1985 | Moore et al. | 60/739 |
| 5,116,251 A | * | 5/1992 | Bichler et al. | 244/53 B |
| 5,129,227 A | * | 7/1992 | Klees et al. | 60/269 |
| 5,167,249 A | * | 12/1992 | Karanian | 137/15.1 |
| 5,351,480 A | * | 10/1994 | Kretschmer | 60/771 |
| 5,946,904 A |   | 9/1999 | Boehnlein | 60/269 |
| 6,109,038 A | * | 8/2000 | Sharifi et al. | 60/737 |

* cited by examiner

*Primary Examiner*—Charles G. Freay
(74) *Attorney, Agent, or Firm*—Dennis W. Beech

(57) ABSTRACT

The ejector based engine is, as an example in an ejector ramjet engine, a propulsion duct having normal augmented ramjet elements of an inlet, mixer, diffuser, combustor and exit nozzle that allow operating velocities from zero to hypersonic. At the upstream end of the mixer an injector assembly is mounted in the fluid flow path to form an ejector. The injector assembly has one or more injector rings which have alternatively offset injector exhaust nozzles or slots to direct fluid toward the engine internal wall or the engine longitudinal axis respectively to improve fluid mixing for use of a shorter mixer section. The supply of fluid to the injector exhaust nozzles may be by fuel flow pumps and other elements connected to injector chambers in the injector ring or by an injector combustor external to the mixer.

32 Claims, 7 Drawing Sheets

EJECTOR BASED ENGINES

BACKGROUND OF THE INVENTION

1. Field of the Invention

This invention relates to apparatus used to power flying vehicles such as aircraft, aerospacecraft, missiles and rockets. The improved engine apparatus provides a combination of ejector and other engine elements to enable efficient engine performance over a wide range of velocity.

2. Description of Related Art

There are currently disclosed in the literature many techniques for construction of ramjet engines and for use of injectors with various engines including ramjet engines to form an ejector to operate cooperatively with the ramjet cycle of the engine. However, no practical, operational ejector ramjet engine for engine operation from zero velocity to hypersonic flight appears to have been developed other than that disclosed in U.S. Pat. No. 5,946,904 by the same inventors as this improved ejector ramjet engine.

The ejector ramjet engine offers advantages relative to the conventional ramjet engine such as sea level static thrust and engine thrust at low level flight speeds. For a given flight condition the ejector ramjet can provide larger engine thrust than the conventional ramjet engine. This may be particularly advantageous during flight vehicle transonic acceleration and hypersonic/high altitude flight conditions where ramjet thrust may not satisfy vehicle requirements. Improved combustor performance due to higher pressure and temperature levels in the combustor can also be achieved which allow combustor operation at higher flight altitudes than possible with a ramjet engine. The ejector ramjet also allows injection of excess oxidizer to enrich the oxidizer in combustion to further increase thrust.

Various methods for augmenting jet engines or ramjet engines have been proposed as typified by the disclosures in U.S. Pat. No. 5,129,227, granted Jul. 14, 1992 and U.S. Pat. No. 5,327,721, granted Jul. 12, 1994. In the case of U.S. Pat. No. 5,129,227, a fuel rich injectant is introduced into the mixing zone of a duct to form an ejector. The composition or equivalency ratio and the temperature of the injected gas are controlled to prevent combustion in the mixing duct. The velocity flow along the wall of the duct is also controlled by the structure of the injector to aid in preventing propagation upstream of the combustion from the combustor.

With regard to U.S. Pat. No. 5,327,721, a rather complex system to improve on the entrainment of fluid as disclosed in related art is presented. An injector is modulated to alternate the direction of the primary fluid jet in an ejector to entrain secondary fluid. The oscillation of the primary jet provides energy exchange between the primary and secondary fluids in the propulsion duct in a substantially non-viscous fashion.

Techniques for mixing fluids or hypermixing are exemplified by U.S. Pat. No. 4,257,224, granted Mar. 24, 1981 and in the article Journal of Aircraft, Volume 9, No. 3, March 1972, Pages 243–248, by Richard B. Fancher, entitled "Low-Area Ratio, Thrust-Augmenting Ejectors". U.S. Pat. No. 4,257,224 presents a method and apparatus for improving the mixing of two fluids using an active element in the vicinity of the beginning of the mixing region. Oscillations are induced in the two fluids about an axis substantially normal to the mixing region flow axis.

The article by Fancher discusses various hypermixing techniques and includes the disclosure of an experimental ejector design and setup. The disclosed design uses a primary nozzle, which is segmented into 24 elements 1½ inches long. Each element gives its exiting mass a velocity component normal to both the nozzle's major axis and the fluid flow axis; the direction of this lateral velocity component was alternated from element to element.

An embodiment of the present invention uses a combination of a variable geometry ramjet engine, an ejector system and an air liquefaction system integrated into a highly efficient, lightweight propulsion system. The inlet has been designed to match the operational profile of a hypersonic air breathing vehicle. For low speed operation the inlet cowl closes to a point that minimizes drag. Air for the air liquefaction system may be ducted through a movable flap inside the engine inlet and the resulting liquid air is either used in the ejector system or may be stored for use at a later time. For high speed flight the inlet cowl opens to its maximum position to capture the maximum amount of air the engine can use; thus maximizing thrust.

An injector assembly having slot nozzles with alternating orientation relative to the longitudinal axis or fluid flow axis of the engine is located at the upstream end of the mixing section. There may be provision to allow an external or internal, relative to the ramjet engine, combustion chamber to create the gas for the injector assembly. For the ejector ramjet engine to function with vehicles that operate over a velocity range of zero to hypersonic, a liquid air cycle process may be used with the injectors that uses the cooling properties of liquid hydrogen stored on the vehicle to liquefy environmental air as the oxidizer for the injector combustion chamber, or a combination of a liquid air cycle process and stored liquid air at initial zero and low velocities. By storing excess liquid air it may be used to augment the air flow received in the inlet when the altitude of the vehicle is such that the air flow received at the inlet is not of sufficient pressure to support combustion in the combustor. Collection and storage of liquid air may also be used at other times to provide low speed operation such as loitering or circling capability during a landing approach and a subsequent power on landing.

SUMMARY OF THE INVENTION

The present invention involves an apparatus for an ejector ramjet propulsion system or engine to operate over the range of velocities from zero to hypersonic. Also, the ejector ramjet engine may operate from altitudes of sea level to greater than 150,000 feet.

Other embodiments of the invention include application of the injector technology to augment the flow path of jet engines such as turbojet, turbofan, turbo ramjet, turbo scramjet, supercharged ejector ramjet and the like engines.

In accordance with the description presented herein, other objectives of this invention will become apparent when the description and drawings are reviewed.

DETAILED DESCRIPTION

Figure 1:
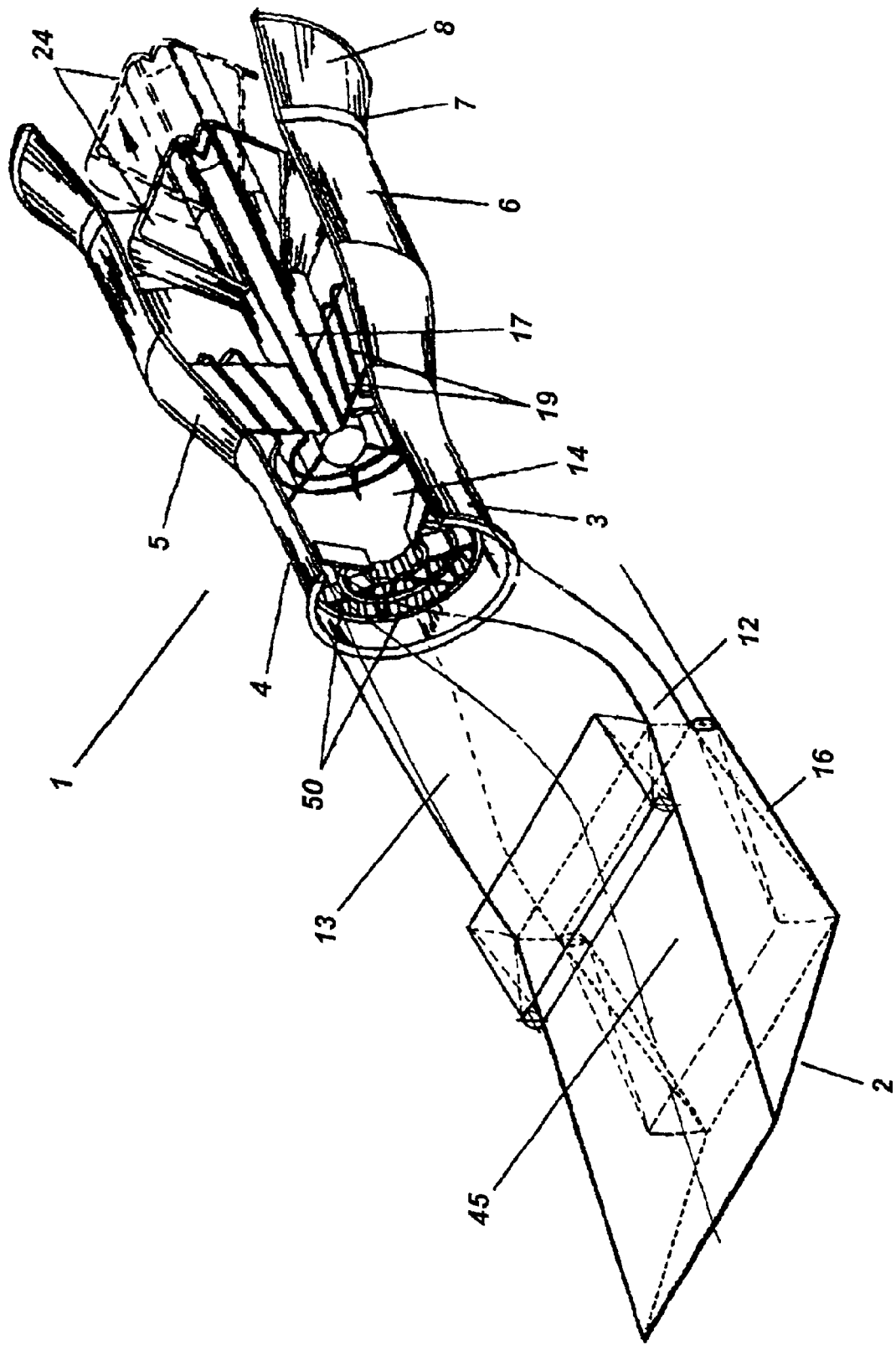
FIG. 1 illustrates a perspective view of the ejector ramjet engine fluid flow stream major elements sectioned to show internal structure and with an external vehicle mounted inlet and duct.

The following detailed description is the best currently contemplated modes for carrying out the invention. The description is not to be taken in a limiting sense, but is made merely for the purpose of illustrating the general principles of the invention.

The ejector ramjet propulsion system or engine may be an augmented variable geometry ramjet engine as commonly understood, having an inlet, mixer, diffuser, combustor and exit nozzle elements or sections integrally connected in the order presented from inlet to exit nozzle. The engine may be of any shape to facilitate vehicle mounting and performance of each elements function in the engine operational cycle. As described in an embodiment a circular cross-section engine may be assumed with a rectangular inlet fairing. An injector structure having injector chambers therein may be mounted in the upstream end of the mixer section normal to the engine longitudinal axis to form an ejector element. The injector element may be connected to an injector combustor or hot gas generator external to the mixer, which produces gas for injection through injector nozzles or slots in the injector element into the mixer. While an ejector ramjet engine is used to describe the preferred embodiment for injector implementation, it is understood that application to other jet engines of the injector apparatus may be similarly implemented.

The injectors for supply of fuel to the combustor section may be located in the downstream end of the guide vanes mounted in the diffuser section. The guide vanes, either full or partial length, aid in faster expansion of the gas flow through the diffuser element without fluid separation from diffuser surfaces.

Either or both a variable inlet and a variable exit nozzle may control air flow and pressure conditions downstream in the engine and in concert optimize location of the inlet normal shock, maximizing thrust and performance over the range of operation.

Referring to FIGS. 1 through 6, the ejector ramjet engine 1 may have a variable inlet 2, mixer 4 including an ejector 3, diffuser 5, combustor 6, a variable area exit nozzle 8 controlled by movable plug 24 which contains a minimum area choke constriction point 7 and exit nozzle 8 expansion surface section integrally connected along the longitudinal or fluid flow axis. In an embodiment the elements may be generally symmetrical about the engine longitudinal axis 9. However, depending on the mounting of the ejector ramjet engine 1 in a particular vehicle structure, elements such as the exit nozzle 8 may be canted, curved or bent relative to the other elements in order to direct the exhaust flow. For a typical ejector ramjet engine 1 there would be stiffening rings, flanges and intercostals outside the fluid flow path in a single wall structural design to provide the necessary rigidity to handle structural forces and to mount the engine in a vehicle. Depending on the operating environment and time of engine operation, cooling of engine elements and insulating film on inside or outside engine walls might be required. For example the combustor 6 and choke constriction point 7 might have cooling means, such as, the engine wall may have areas through which a fuel, liquid hydrogen, can be cycled for cooling the engine and also to warm the fuel to enhance combustion. Should cooling of the inlet 2, ejector 3, mixer 4 and diffuser 5 be required, use of some of the stored liquid air can be used for this purpose. Disposal of the resulting warm air may be to the engine flow path or to its compartment in the vehicle.

Figure 4:
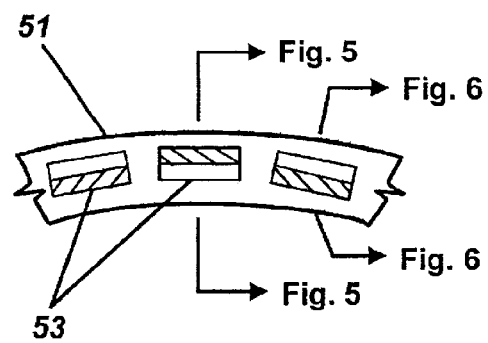
FIG. 4 illustrates a portion of the injector ring with injector exhaust nozzle alternatingly offset or canted relative to the major fluid flow axis.
Figure 5:
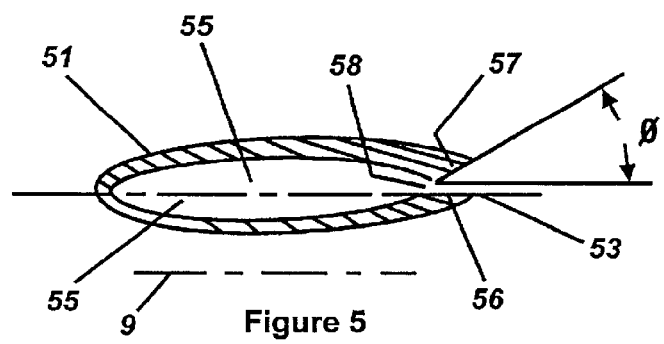
FIG. 5 illustrates a cross-section of the injector ring with injector chamber and the injector exhaust nozzle canted away from the mixer centerline.
Figure 6:
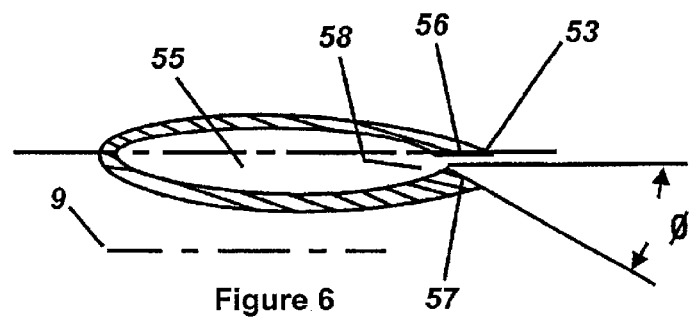
FIG. 6 illustrates a cross section of the injector ring with injector chamber and the injector exhaust nozzle canted toward the mixer centerline.
Figure 7:
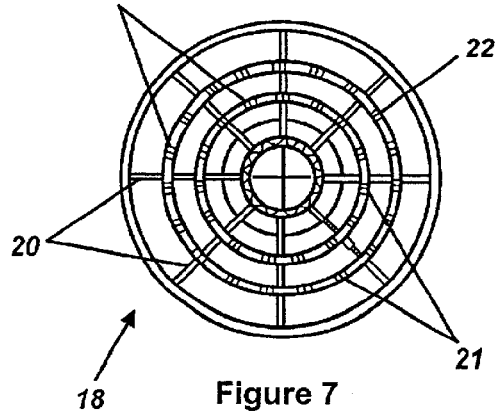
FIG. 7 illustrates an end view of the diffuser guide vane assembly with fuel injectors.

The ejector 3 area of the mixer 4 section has an injector assembly 50 with one or more injector elements 51 mounted in the fluid flow stream supported by struts 52. The injector elements 51 may be streamlined hollow tubes with injector exhaust nozzles 53 or slots formed therein; however, the injector element 51 is preferably an annular assembly with an aerodynamic cross section having injector chambers 55 spaced around the injector element 51 as illustrated in FIGS. 4 through 6. The injector exhaust nozzles 53 may be oriented to direct fluid release in the downstream flow direction partially offset from the engine longitudinal air flow axis. The injector exhaust nozzles 53 may be structured in an alternating pattern relative to each other at an angle offset or canted from parallel to the engine longitudinal axis 9 as illustrated in FIGS. 4 through 6.

The ejector 3 may be used to augment thrust at various ramjet/scramjet speeds to increase the thrust of the engine. For example, use of the ejector 3 at extremes of the engine envelope may increase the normal operating limits. Also when the ejector 3 is operating at high speed and altitude at a nominal to lean fuel to air ratio, the fluid flow may cool the air between the mixer 4 and the combustor 6 wherein approximately all of the oxidizer may be burned.

Fuel may be injected into the air stream flowing external to the ejector ramjet engine 1 to cause combustion in order to increase the surface pressure on the aft facing areas of the engine and the flight vehicle. A piloting device 44 may be used to cause ignition of the fuel and to aid in the maintenance of combustion. A flame holding device 47 may also be used to position the flame in a specific location. Also, control valves 41 and injection device 40 may be used to control the resultant force vector caused by the combustion process.

Figure 3:
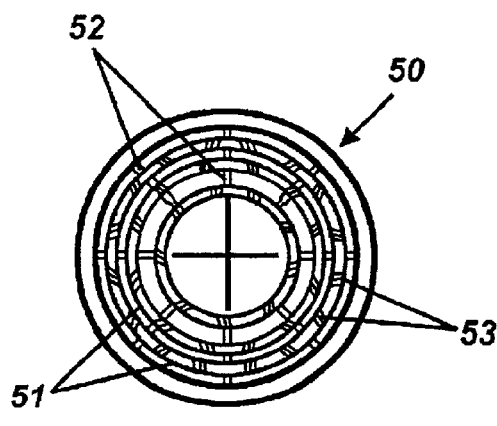
FIG. 3 illustrates a plan view of a multiple ring injector structure with injector exhaust nozzles as slots.
Figure 3A:
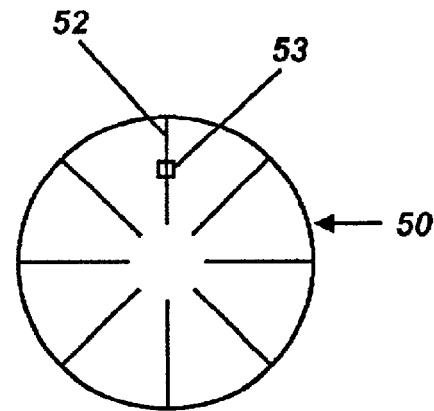
FIG. 3A illustrates a plan view of a multiple strut injector structure with injector exhaust nozzles as slots.
Figure 3B:
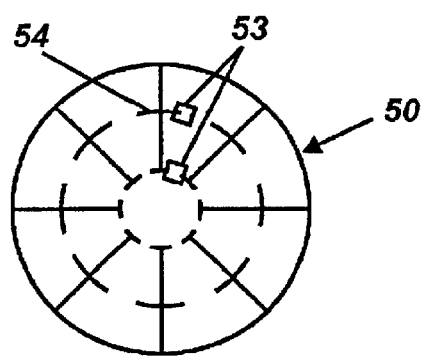
FIG. 3B illustrates a plan view of a multiple section ring injector structure with injector exhaust nozzles as slots.
Figure 3C:
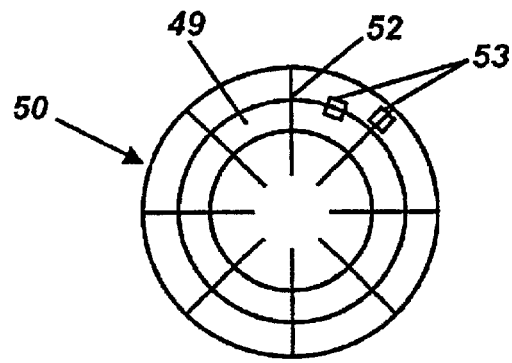
FIG. 3C illustrates a plan view of a combination multiple strut and ring injector configuration with injector exhaust nozzles as slots.
Figure 3D:
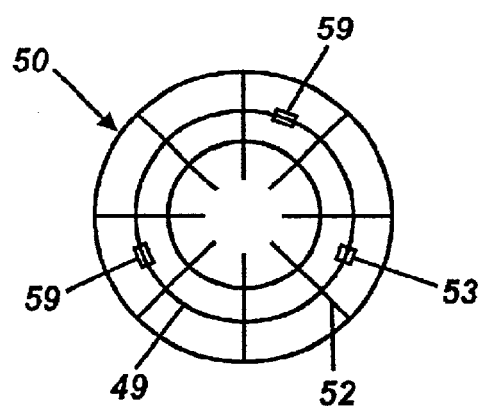
FIG. 3D illustrates a plan view of a multiple ring injector structure, which incorporates slip joints with injector exhaust nozzles as slots.
Figure 3E:
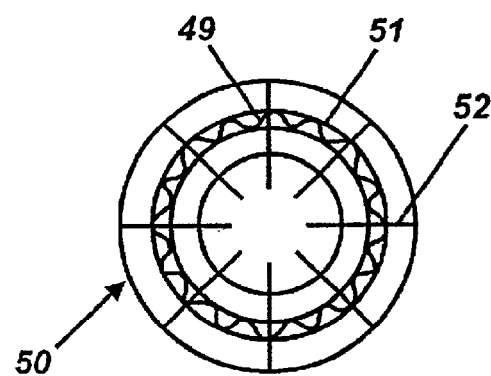
FIG. 3E illustrates a plan view of a multiple ring injector structure with the injector exhaust nozzles geometrically varied along the radial axis of the ring, as an example, in a sinusoidal manner.

While an annular assembly for the injector elements 51 has been described, other configurations are also possible. The injector assembly 50 may have radial struts 52 with injector exhaust nozzles 53 formed therein as illustrated in FIG. 3a. Further the radial struts 52 may have ring segments 54 with injector exhaust nozzle 53 formed therein as illustrated in FIG. 3b. Injector exhaust nozzle 53 may also be located on radial struts 52 and ring elements 49, 54. The injector assembly 50 with annular rings 49 may have slip joints 59 as expansion and contraction elements. The injector exhaust nozzles 53 may be formed in other geometric, trigonometric or higher order function configurations, such as a sinusoidal pattern or the like to achieve the mixing of fluids in the engine 1 as illustrated in FIG. 3e. The injector exhaust nozzle 53 may also have a varying function opening relative to their radial distance from the engine longitudinal axis. The dimensions of the openings as an example may be larger each relative to the other depending on the distance from the engine longitudinal axis. For example, injector exhaust nozzles 53 on a strut 52 may have larger openings near the wall of the engine as compared to near the engine longitudinal axis. Other techniques may be used if for example, uniform fuel distribution may be desired as an operational mode.

Referring to FIGS. 2 through 6, in one experiment the injector exhaust nozzles 53 were formed as slots wherein the longitudinal axis of adjacent slots was oriented at an angle 15 degrees radially away from and toward the engine longitudinal axis 9 in an alternating pattern. The slot is formed such that the injector exhaust nozzle 53 has an exit nozzle face 56 parallel to the engine longitudinal axis 9 and an offset exit nozzle face 57 and the slot creates a throat 58 of desired opening size and shape for the ejector 3 operation. This provides for a velocity component in the exiting exhaust gas normal to the engine longitudinal axis 9 and inlet 2 fluid flow. This causes injection of fluid from adjacent nozzles directed alternately toward the mixer 4 section engine internal wall 14 and the engine longitudinal axis 9. The offset of the injector exhaust nozzles 53 in an alternating pattern may provide for more rapid mixing of the injector ring 49 introduced fluid with the entrained or velocity induced air from the inlet 2 section. This may allow a much shorter mixer 4 section in the ejector ramjet engine 1. In the particular experiment conducted, one injector ring 49 was used with a mixer 4 length of 13 inches and a diameter of 8 inches thus allowing for a significantly reduced length engine. In this experiment the injector combustor 15 or hot gas generator was external to the mixer 4 section with the combustion gases ducted to the injector ring 49 to be exhausted through injector exhaust nozzles 53 or slots therein, reference FIG. 9. The other configurations described herein whether struts, strut ring segments or the like may also provide a reduction in mixer 4 length.

Figure 8:
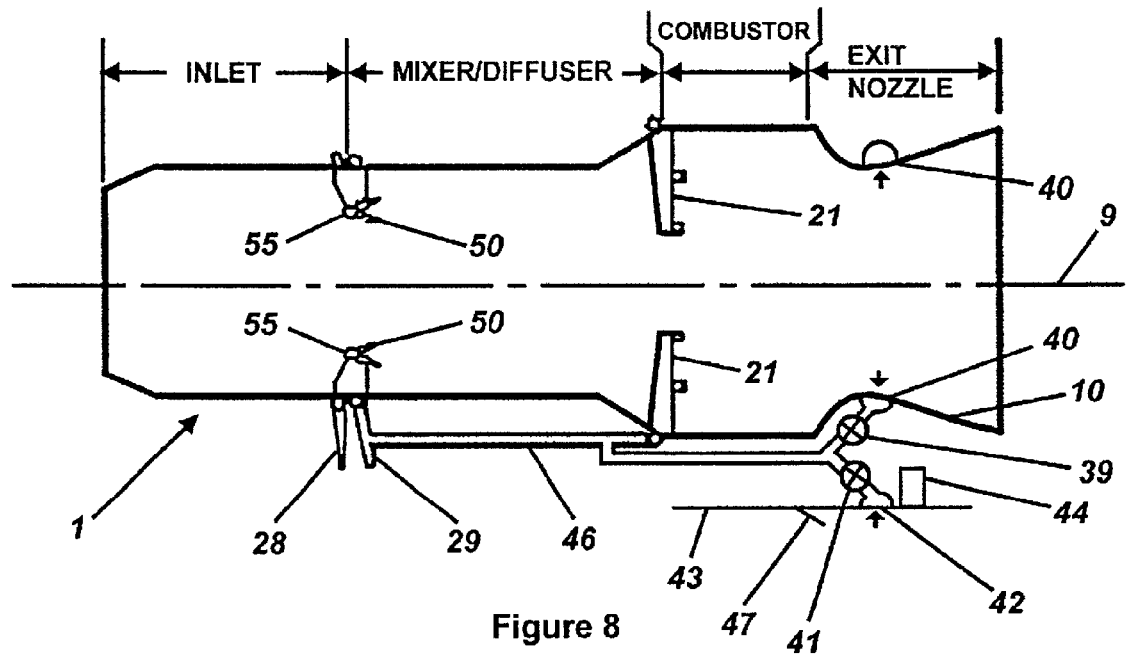
FIG. 8 illustrates a schematic of the invention with an ejector hot gas generator integrally contained in the injector assembly and provision to inject gas at selected engine locations.
Figure 9:
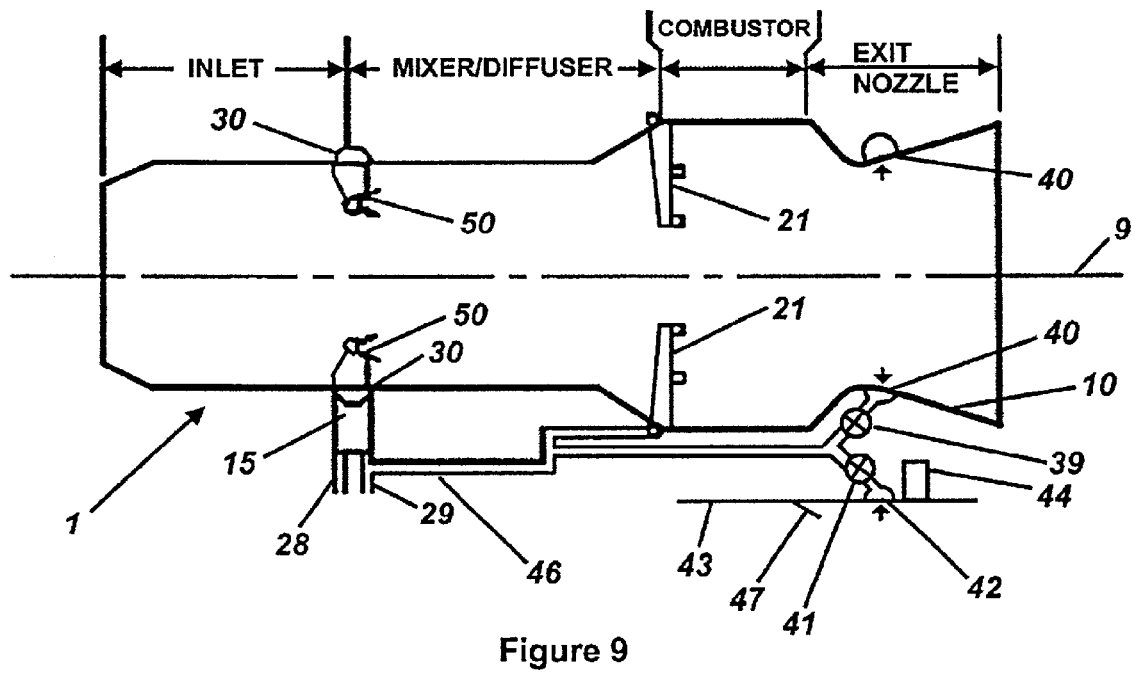
FIG. 9 illustrates a schematic of the invention with an ejector hot gas generator located external to the injector assembly, the hot gas ducted into the injector chamber and provision to inject gas at selected engine locations.
Figure 10:
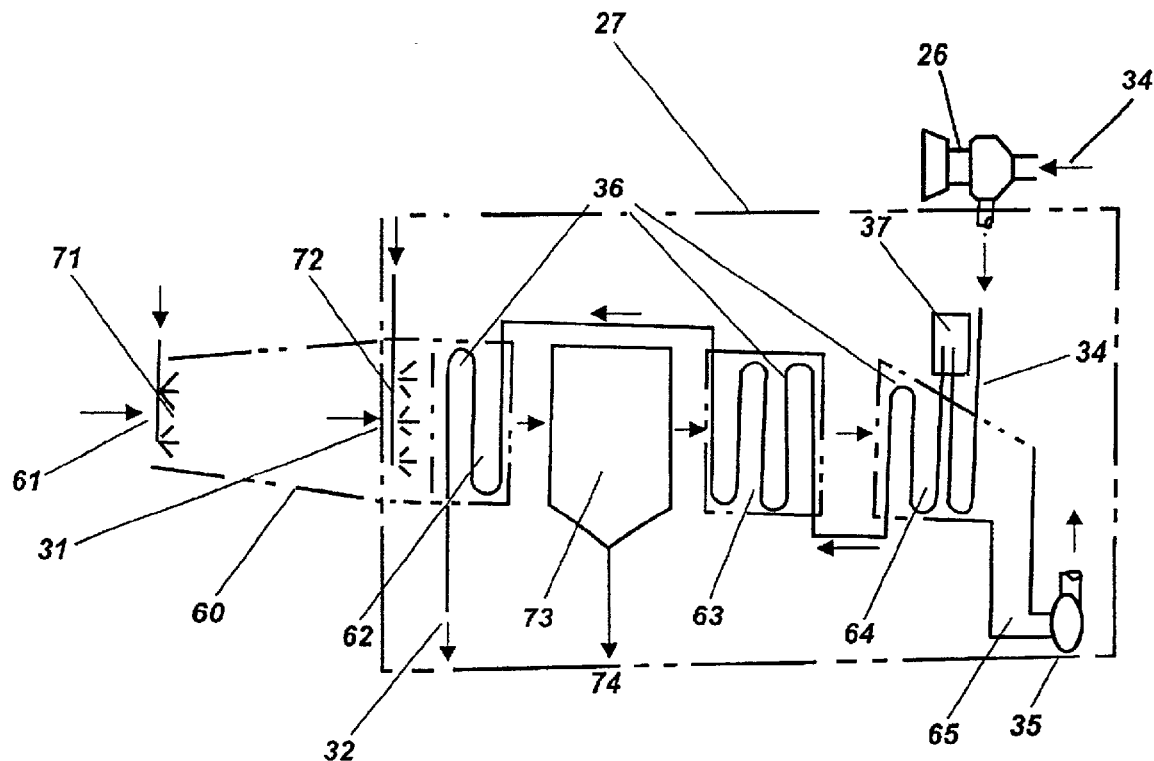
FIG. 10 illustrates a schematic of a system to utilize the latent heat of the fuel, liquid hydrogen, to generate an oxidizer, liquid air.
Figure 11:
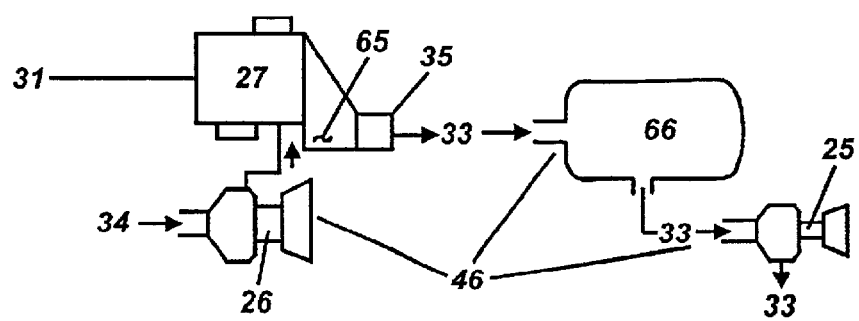
FIG. 11 illustrates a schematic of integrating the ejector ramjet liquid feed system with an air liquefaction device.

Referring to FIGS. 8, 9 and 11, to create an energetic gas jet at the injector assembly 50 it may be connected to any fluid source to supply fluid to create a jet at the injector exhaust nozzles 53 for the ejector 3 operation to entrain air for sufficient fluid flow to mix with fuel in the combustor 6 for efficient operation of the ejector ramjet engine 1. In one embodiment a fluid supply system 46 may include a fuel such as hydrogen and an oxidizer such as air used in an injector combustor 15 external to the ejector ramjet engine 1 to create a pressurized energetic gas stream to be routed by hot gas ducts 30 to the injector assembly 50 as in FIG. 9 or alternatively the combustion may occur internal to the injector assembly 50 with fuel and oxidizer supplied to the injector chambers 55 as in FIG. 8.

Referring to FIGS. 8 through 12, liquid hydrogen may be stored in the vehicle on which the ejector ramjet engine 1 is mounted. To provide for a more efficient, higher performance vehicle, the air may be obtained from the environment. The liquid hydrogen may be used in a heat exchanger system 36, which is a part of the air liquefaction system 27, to liquefy air for temporary storage and use while the vehicle is operating rather than requiring handling and storage of a large quantity of liquid air or other oxidizer on the vehicle prior to operation. The heat exchanger system 36 may receive liquid hydrogen 34, or fuel, from the vehicle fuel tank pumped by a fuel pump 26 to increase its pressure prior to entering the air liquefaction unit 27. Air may be collected by a vehicle air inlet port 61 that may be separately mounted on the vehicle, or it may be a part of the ejector ramjet inlet 2, or it may be a combination of both methods. The air may be ducted to the heat exchanger system 36 air liquefaction unit inlet 31. Air may be collected by an air liquefication inlet 60 having an inlet port 61 and ducted into the air liquefication unit 27 where it may be condensed and collected in a sump 65. A sump pump 35 may increase pressure and cause discharge of the liquid air 33 into a storage tank 66 or into the engine liquid air supply inlet 28 from the liquid air pump 25. The hydrogen discharge 32 may normally be supplied to the engine fuel supply inlet 29.

For a given configuration excess hydrogen may be used to generate additional liquid air for use by the propulsion system at low speed. This excess hydrogen may be supplied to the engine fuel inlet 29 and may be used in one or a combination of the following methods to improve engine performance. It may be added to the combustor 6 by the injector 21, it may be added in the exit nozzle 8 through a control valve 39 and injection device 40, or it may be injected through an external burning control valve 41 and injector 42 into the free stream air flowing along an external engine fairing 43 where it may be ignited by an igniter 44 which may burn continuously to maintain combustion with the aid of a flame holder 47.

The condensation of the air may be accomplished by using one or more precoolers 63 connected in series with one or more condensers 64 around which the liquid hydrogen 34 circulates to provide the cooling element. This is schematically presented in FIG. 10, which illustrates an air inlet duct 60 to secondary precooler 62, which communicates cooled air to a moisture separator 73, which is further communicated to the primary precooler 63 and a condenser 64. The liquid hydrogen 34 may be pumped by means of fuel pump 26 to circulate coolant through the condenser 64 to the primary precooler 63 and then to the secondary precooler 62. This process may warm the liquid hydrogen 34, which exits the heat exchanger system 36 at precooler liquid hydrogen exit port 32.

An optional catalyst 37 may be used with the condenser 64 to recover heat sink capability by changing the hydrogen from its para to ortho state. The catalyst 37 may be inserted as a separate unit in the hydrogen flow between condenser passes or in the flow passages directly.

The air liquefaction inlet port 61 may be located in the ejector ramjet inlet 2. The actuator 68 controls the position of the inlet port 61 flap 76, which in turn controls the amount of air flowing to the air liquefaction unit 27. When water vapor is present in the air a humectants spray system 72 may be used. The humectant may be a liquid, like anti freeze, which absorbs water as it condenses in the secondary precooler 62. This liquid may be removed by a liquid/air separator 73 and drain 74. The air inlet may also include a spray coolant system 71 to cool the air, at high speed, prior to its entry into the secondary precooler 62. The spray system 71 may be designed as an ejector pump to increase the pressure of the air entering the air liquefaction inlet duct 60.

Figure 2:
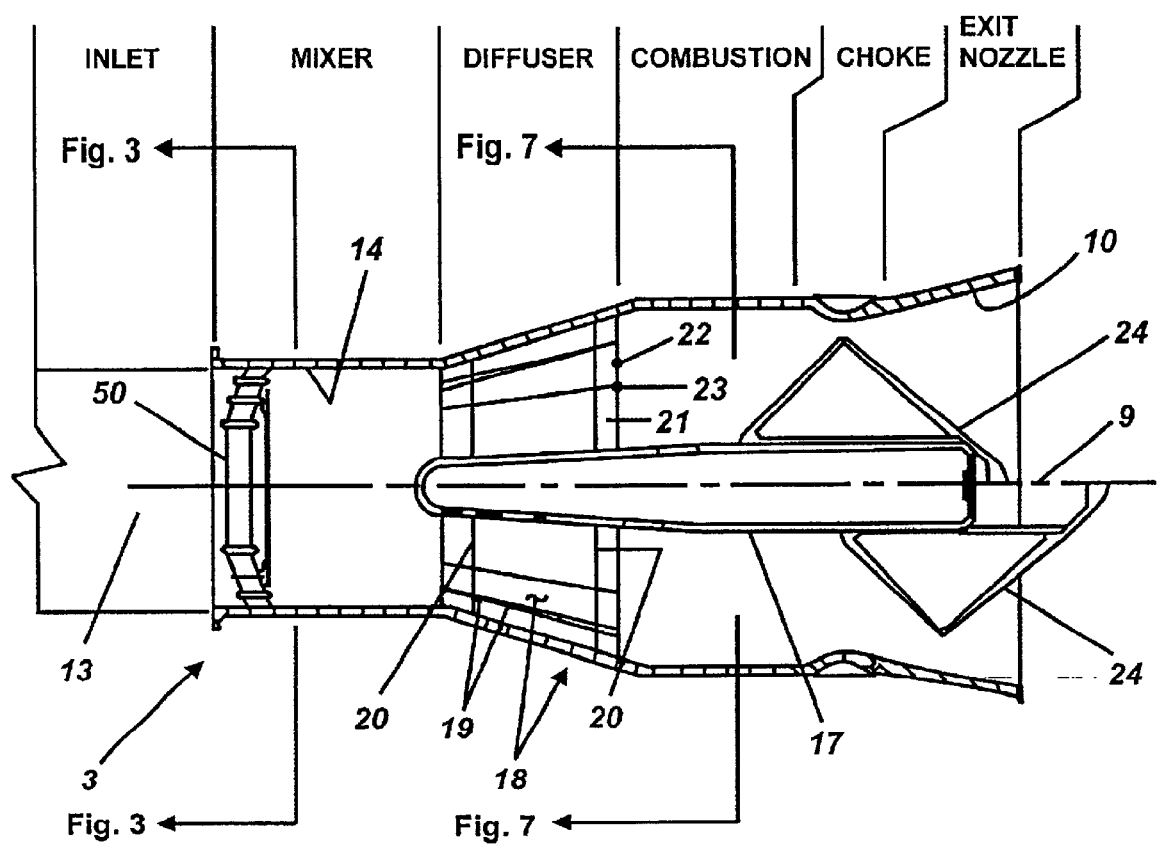
FIG. 2 illustrates a schematic sectional view of the ejector ramjet engine with truncated inlet.
Figure 12:
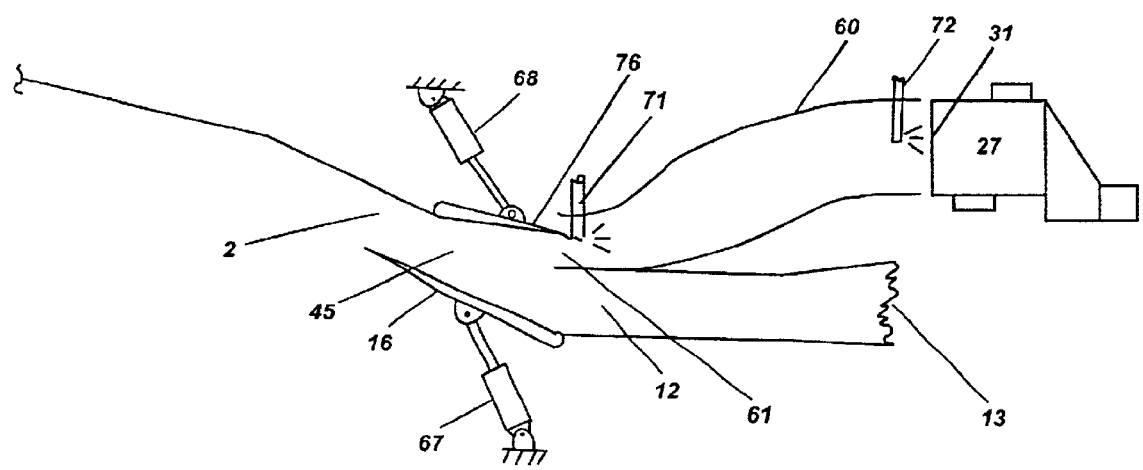
FIG. 12 illustrates a schematic side elevation view of the engine variable inlet with provision for the air liquefaction inlet.

Referring to FIGS. 1, 2 and 12, the ejector ramjet engine 1 may have an inlet fairing 16 and inlet 2 for proper inlet geometry over the operating range, which may include the vehicle airframe structure for conditioning inlet air. A variable inlet system 45 may be used to maximize performance of the ejector ramjet. At low speed the engine may use less air flow than it does at high speed. A variable inlet fairing 16 may be added to the inlet 2 and be actuated by an actuator 67. At low speed the inlet fairing may be moved in a direction to reduce the inlet height, which may reduce drag, and at higher speed the inlet fairing may be opened to increase air flow and hence thrust.

The inlet fairing 16 may also be designed to act as an inlet closure in order to prevent engine airflow at planned phases of a flight or during an emergency. The inlet isolator 12 may be designed to contain a shock train during super sonic operation so that the flow into the downstream inlet diffuser 13 may be subsonic. This inlet diffuser 13 connects the isolator 12 to the mixer 4 inlet. The location of the air liquefaction inlet 61 inside the ejector ramjet variable air inlet 2 provides some beneficial pre compression to the air entering the air liquefaction inlet 61. The inlet 2 must pass more air than the ejector ramjet requires at low speed, since the inlet 2 provides air to the air liquefaction system as well as the air required by the ejector ramjet. Since more air may be entering the inlet 2 there may be less air spilled by the inlet at a given design point. Since the airflow may vary with the flight conditions, a variable inlet fairing 16 may be required to match the inlet opening with airflow requirements, thus minimizing the spill drag. At high speeds the ejector ramjet may use more air than it does at low speeds and the variable inlet fairing 16 may be opened to provide the capability to capture more airflow. This may require the fixed isolator 12 to process relatively more air, which require that the air flow stream be contracted or compressed to a greater degree. When this occurs the inlet pressure recovery may increase which also increases thrust.

A center body fairing 17 may be provided for diffuser 5, combustor 6 and exit nozzle 8 to enhance performance although the extent to which it extends into the diffuser 5 depends on the application. To promote rapid fluid flow expansion in the diffuser 5 a guide vane assembly 18 may be used. The guide vane assembly 18 may be comprised of one or more conical cylindrical guide vanes 19 axially mounted in the fluid flow path in the diffuser 5 section and retained by vane struts 20. In an embodiment the fuel injectors 21 may be fuel nozzles 22 in the downstream end 23 of the guide vanes 19. The fuel nozzles 22 may inject fuel parallel to the engine longitudinal axis 9 or may be alternately offset to promote mixing of fluids as previously discussed for the injector exhaust nozzles 53.

To further provide for efficiency in mixing and combustion, a movable plug 24 may be used in combination with the variable inlet system 45. The movable plug 24 may be mounted on the center body fairing 17 with a means to control or allow adjustment of the position of the movable plug 24 by a rod connected to a piston (not shown) in the center body 17 which position may be controlled by an engine performance monitor system for control longitudinally along the engine longitudinal axis 9. As the movable plug 24 is adjusted relative to the choke constriction point 7 the area of the combustor 6 section is changed and the cross-sectional area and location of the choke minimum flow area point may be varied to control the aerodynamic location of the inlet normal shock. Obviously the area of the exit nozzle 8 may be varied as well. In FIG. 2 the movable plug 24 is illustrated split to show two positions. The movable plug 24 is one method to provide variable geometry conditions to control the location of the nozzle throat minimum flow area point, which also adjusts the aerodynamic location of the inlet normal shock, internal engine velocity and pressure depending on the operating environment of the ejector ramjet engine 1. Typically the movable plug 24 may be cooled by routing fuel, such as, liquid hydrogen, through cooling passages in the movable plug 24 prior to injecting the fuel into the combustor 6. Use of a variable choke area exit nozzle 8 may permit engine operation at maximum inlet 2 performance and for high performance may permit the mixer 4 exit Mach number to approach but not reach sonic velocity. Use of the variable choke area exit nozzle 8 may ensure local choking will not occur in the mixer 4 or diffuser 5.

To further improve ejector ramjet engine 1 performance a gas may be injected into the exit nozzle 8. The gas may be injected into the exit nozzle divergent portion 10 to initiate separation in the exit nozzle 8 during low speed operation to increase pressure on the aft facing divergent portion thereof. The injection of a gas may also be used in an over-expanded exit nozzle (not shown) to control the location of the separation to prevent unwanted motion of the separation point. Further, a gas may be injected in a supersonic functioning exit nozzle to modify or control the location of the thrust vector. The gas injection may be accomplished by the use of any fluid injection in the exhaust stream that may vaporize, decompose, combust or otherwise react with the flow.

While the invention has been particularly shown and described with respect to the illustrated and preferred embodiments thereof, it will be understood by those skilled in the art that the foregoing and other changes in form and details may be made therein without departing from the spirit and scope of the invention.

We claim:

1. An ejector ramjet engine suitable for use with a flying vehicle in a range of speeds from zero to hypersonic flight comprising:

an inlet with a variable inlet system attached to a mixer located downstream therefrom;

the mixer having an injector assembly mounted in the fluid flow zone of the mixer near the intersection with the inlet to form an ejector and a fluid supply system connected to the injector assembly wherein the injector assembly having a plurality of injector exhaust nozzles defined therein with the injector exhaust nozzles oriented to direct fluid release in the downstream flow direction partially offset from the engine longitudinal axis wherein the injector exhaust, nozzles are alternatively offset radially at an angle away from and toward the engine longitudinal axis and the injector assembly supported in the mixer by a support element attached to an engine internal wall;

a diffuser having an expanding cross sectional area relative to the mixer attached downstream of the mixer;

a combustor having a larger cross sectional area relative to the mixer attached downstream of the diffuser and the fluid supply system connected to the combustor;

an exit nozzle having an expanding cross sectional area relative to the combustor attached downstream of the combustor with a choke constriction point intermediate the combustor and the exit nozzle.

2. The ejector ramjet engine as in claim 1 wherein the variable inlet control system comprising:

an actuator system to move an inlet fairing;

a second actuator system to move a flap in an internal inlet port;

a fixed isolator in which a shock train is contained by the actions of a downstream ejector, combustor and variable area exit nozzle;

the fixed isolator wherein the relative compression of the inlet is controlled by the inlet fairing actuator to maximize pressure recovery and airflow; and the fixed isolator wherein the spill drag of the inlet may be controlled by the inlet flap actuator to minimize spill drag of the inlet.

3. The ejector ramjet engine as in claim 1 wherein the injector assembly comprising an injector ring having the injector exhaust nozzles therein.

4. The ejector ramjet engine as in claim 1 wherein the injector assembly comprising a plurality of radial struts having the injector exhaust nozzles therein.

5. The ejector ramjet engine as in claim 1 wherein the injector assembly comprising a plurality of radial struts with ring segments attached thereto having the injector exhaust nozzles therein.

6. The ejector ramjet engine as in claim 1 wherein the injector assembly comprising a combination of injector rings and radial struts having the injector exhaust nozzles therein.

7. The injector assembly as in claim 3 wherein the injector ring having a slidable connection therein.

8. The injector assembly as in claim 1 wherein the injector exhaust nozzles are formed as a varying function opening relative to the radial distance from the longitudinal axis.

9. The ejector ramjet engine as in claim 1 wherein the fluid supply system connected to the injector assembly is an external gas generator.

10. The ejector ramjet engine as in claim 1 wherein the fluid supply system connected to the injector assembly is an injector combustor.

11. The ejector ramjet engine as in claim 1 wherein the fluid supply system connected to the injector assembly is a fuel and an oxidizer for combustion internal to the injector assembly.

12. The ejector ramjet engine as in claim 1 wherein adjacent injector exhaust nozzles are alternatively offset at an angle away from and toward respectively the engine longitudinal axis.

13. The ejector ramjet engine as in claim 10 wherein the injector combustor and the injector assembly use scramjet gaseous fuel in a subsonic and supersonic flow stream.

14. The ejector ramjet engine as in claim 1 wherein the exit nozzle has a movable plug mounted on a center body fairing for varying the choke constriction location.

15. The ejector ramjet engine as in claim 10 wherein the injector combustor is a ducted rocket hot gaseous source.

16. The ejector ramjet engine as in claim 1 wherein the ejector may function as a thrust augmenter at nominal ramjet and scramjet speeds to increase thrust while operating at high speed and altitude: increasing fluid flow to the injector assembly to increase the ejector ramjet engine operating limits; and using a nominal to lean fuel to air ratio to cool the air between the mixer and the combustor.

17. The ejector ramjet engine as in claim 1 wherein a fluid may be injected into an exit nozzle divergent portion during low speed operation to initiate separation of exhaust in the exit nozzle and to control the location of the separation.

18. The ejector ramjet engine as in claim 1 wherein a fluid may be injected into an exit nozzle divergent portion during supersonic function of the exit nozzle to modify the location of the thrust vector.

19. The ejector ramjet engine as in claim 1 wherein: a fuel is injected into an air stream flow external to the ejector ramjet engine and ignited by en ignition device; and a flame holding device maintains flame location and an injection device with a control valve controls the resultant force vectors caused by the combustion process.

20. The ejector ramjet engine as in claim 1 wherein the fluid supply system further comprising a heat exchanger system for liquefication of and storage of liquid air for use as an oxidizer in the injector assembly.

21. The ejector ramjet engine as in claim 20 wherein the heat exchanger system comprising:

an air liquefication unit having an air inlet with an inlet port defined therein and the air inlet in fluid communication with a secondary precooler assembly and a primary precooler assembly;

a condenser in fluid communication with the primary precooler assembly and with a sump from which liquid air is pumped to a liquid air storage tank;

the liquid air storage tank having an outlet port to supply liquid air to the ejector ramjet engine;

the condenser having an inlet port for receipt of liquid hydrogen;

the condenser in fluid communication with the primary precooler assembly to transfer liquid hydrogen thereto and then to the secondary precooler having a liquid hydrogen exit port; and the liquid hydrogen having a temperature differential relative to the air received by the air liquefication unit sufficient to cool the air to be condensed to liquid air.

22. The ejector ramjet engine as in claim 21 wherein the air inlet having a humectant injection system.

23. The ejector ramjet engine as in claim 21 wherein the air inlet having a spray coolant system.

24. The ejector ramjet engine as in claim 21 wherein the air inlet having an air pump downstream of the inlet port.

25. The ejector ramjet engine as in claim 21 wherein a separator for removal of water and fluids other than liquid air is intermediate and in fluid communication with the secondary precooler and a primary precooler wherein the liquid hydrogen first passes through the primary precooler and then the secondary precooler.

26. The device as in claim 21 wherein there are a plurality of primary precoolers.

27. The device as in claim 21 wherein there are a plurality of secondary precoolers.

28. An injector assembly suitable for mounting in the fluid flow path of jet engines such as turbojet, turbofan, turbo ramjet, turbo scramjet, supercharged ejector ramjet and the like as well as other gas flow paths such as in aircraft which use directed gas flow for vertical lift comprising:

an injector assembly having a plurality of injector exhaust nozzles formed in a plurality of radial struts therein;

the injector exhaust nozzles oriented to direct fluid release in the downstream flow direction partially offset radially at an angle away from and toward the fluid flow path longitudinal axis; and the injector assembly supported in the fluid flow by a support element.

29. An injector assembly suitable for mounting in the fluid flow path of jet engines such as turbojet, turbofan, turbo ramjet, turbo scramjet, supercharged ejector ramjet and the like as well as other gas flow paths such as in aircraft which use directed gas flow for vertical lift comprising:

an injector assembly having a plurality of injector exhaust nozzles formed in a plurality of struts having ring segments attached thereto;

the injector exhaust nozzles oriented to direct fluid release in the downstream flow direction partially offset radially at an angle away from and toward the fluid flow path longitudinal axis; and the injector assembly supported in the fluid flow by a support element.

30. An injector assembly suitable for mounting in the fluid flow path of jet engines such as turbojet, turbofan, turbo ramjet, turbo scramjet, supercharged ejector ramjet and the like as well as other gas flow paths such as in aircraft which use directed gas flow for vertical lift comprising:

an injector assembly having a plurality of injector exhaust nozzles defined formed in a combination of injector rings and radial struts;

the injector exhaust nozzles oriented to direct fluid release in the downstream flow direction partially offset radially at an angle away from and toward the fluid flow path longitudinal axis; and the injector assembly supported in the fluid flow by a support element.

31. An injector assembly suitable for mounting in the fluid flow path of jet engines such as turbojet, turbofan, turbo ramjet, turbo scramjet, supercharged ejector ramjet and the like as well as other gas flow paths such as in aircraft which use directed gas flow for vertical lift comprising:

an injector assembly having a plurality of injector exhaust nozzles formed in an injector ring;

the injector exhaust nozzles oriented to direct fluid release in the downstream flow direction partially offset radially at an angle away from and toward the fluid flow path longitudinal axis;

the injector assembly supported in the fluid flow by a support element; and the injector rings having a slidable connection therein.

32. An injector assembly suitable for mounting in the fluid flow path of jet engines such as turbojet, turbofan, turbo ramjet, turbo scramjet, supercharged ejector ramjet and the like as well as other gas flow paths such as in aircraft which use directed gas flow for vertical lift comprising:

an injector assembly having a plurality of injector exhaust nozzles defined therein;

the injector exhaust nozzles oriented to direct fluid release in the downstream flow direction partially offset radially at an angle away from and toward the fluid flow path longitudinal axis;

the injector assembly supported in the fluid flow by a support element; and wherein the exhaust nozzles formed as a varying function opening relative to the radial distance from the longitudinal axis.

\* \* \* \* \*